US009986252B2

(12) United States Patent
Sabelkin

(10) Patent No.: US 9,986,252 B2
(45) Date of Patent: May 29, 2018

(54) METHOD AND APPARATUS FOR EFFICIENT DATA COMMUNICATIONS

(71) Applicant: Mykhaylo Sabelkin, Fairborn, OH (US)

(72) Inventor: Mykhaylo Sabelkin, Fairborn, OH (US)

( * ) Notice: Subject to any disclaimer, the term of this patent is extended or adjusted under 35 U.S.C. 154(b) by 0 days. days.

(21) Appl. No.: 15/466,727

(22) Filed: Mar. 22, 2017

(65) Prior Publication Data

US 2017/0195682 A1    Jul. 6, 2017

Related U.S. Application Data

(60) Continuation-in-part of application No. 14/809,727, filed on Jul. 27, 2015, now abandoned, and a continuation of application No. 14/809,707, filed on Jul. 27, 2015, which is a division of application No. 13/090,608, filed on Apr. 20, 2011, now abandoned, said application No. 14/809,727 is a continuation of application No. 13/090,608, filed on Apr. 20, 2011, now abandoned.

(60) Provisional application No. 61/326,579, filed on Apr. 21, 2010.

(51) Int. Cl.
| | |
|---|---|
| *H04B 1/38* | (2015.01) |
| *H04N 19/42* | (2014.01) |
| *H04N 19/184* | (2014.01) |
| *H04N 19/91* | (2014.01) |

(52) U.S. Cl.
CPC ............... *H04N 19/42* (2014.11); *H04B 1/38* (2013.01); *H04N 19/184* (2014.11); *H04N 19/91* (2014.11)

(58) Field of Classification Search
CPC ...... H04N 19/42; H04N 19/184; H04N 19/91; H04B 1/38
See application file for complete search history.

(56) References Cited

U.S. PATENT DOCUMENTS

| | | | | |
|---|---|---|---|---|
| 5,953,506 | A * | 9/1999 | Kalra | ............... G06T 3/4092 345/428 |
| 6,973,475 | B2 * | 12/2005 | Kenyon | ............... H04L 29/06 375/E7.013 |
| 8,635,356 | B2 * | 1/2014 | Park | ............... H04N 21/234327 370/390 |

(Continued)

*Primary Examiner* — Kenneth Lam

(57) ABSTRACT

A method and apparatus for Data Transmission Oriented on the Object, Communication Media, Agents, and State of Communication Systems (TOMAS) is disclosed. TOMAS addresses an issue of efficiency of conventional data communication systems. The superior efficiency of TOMAS is achieved by: 1) matching the requirements of agents with capabilities of the communication systems and the communication media using the features of data objects; 2) monitoring of time-varying characteristics of all components, such as a charge of batteries and a status of all hardware, firmware and software components; 3) using an information about time-invariant characteristics of the systems, such as devices screen sizes, employed operational systems (OS), etc.; 4) using a flexible system architecture; and 5) using a fast signal processing algorithm described in [12] and [9] at the stage of data object analysis-syntesis and the codestream multiplexing-demultiplexing.

10 Claims, 4 Drawing Sheets

The TOMAS transceiver structure

(56) References Cited

U.S. PATENT DOCUMENTS

| | | | |
|---|---|---|---|
| 2002/0076043 A1* | 6/2002 | Van Der Vleuten | H04N 19/46 380/37 |
| 2004/0128308 A1* | 7/2004 | Obrador | G06F 17/30056 |
| 2005/0141459 A1* | 6/2005 | Li | H04B 7/0417 370/334 |
| 2006/0092938 A1* | 5/2006 | Gentrix | H04L 29/06 370/390 |

* cited by examiner

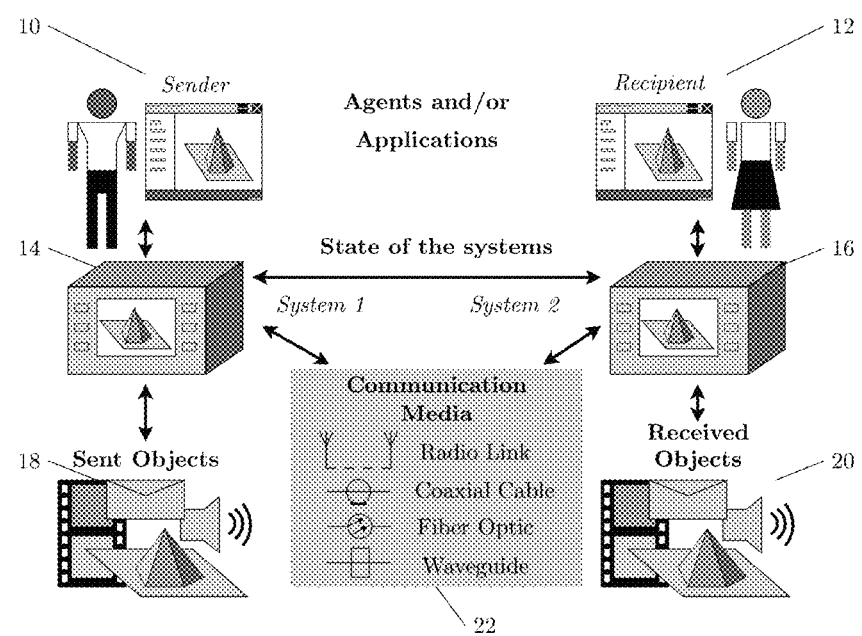
Fig. 1: Data Transmission Oriented on the Object, Communication Media, Agents, and State of Communication Systems

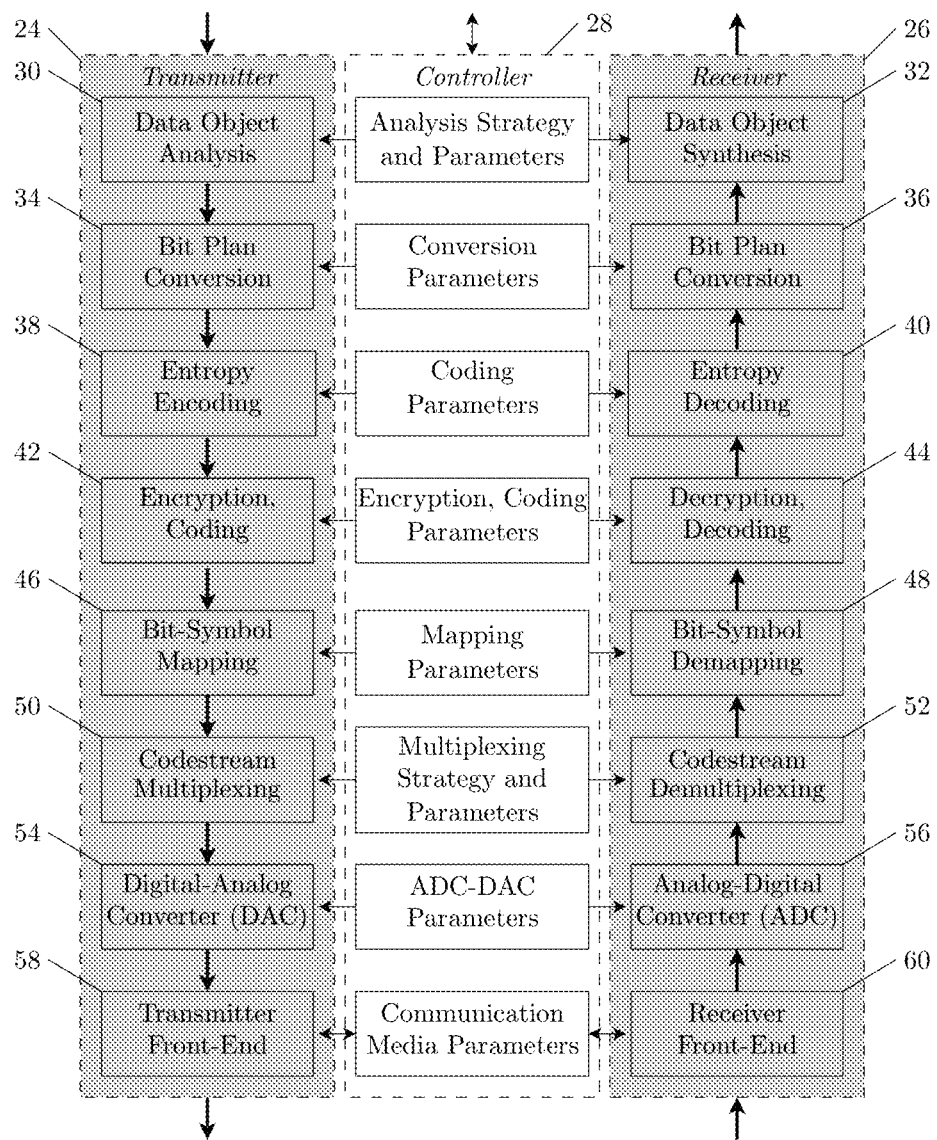
Fig. 2: The TOMAS transceiver structure

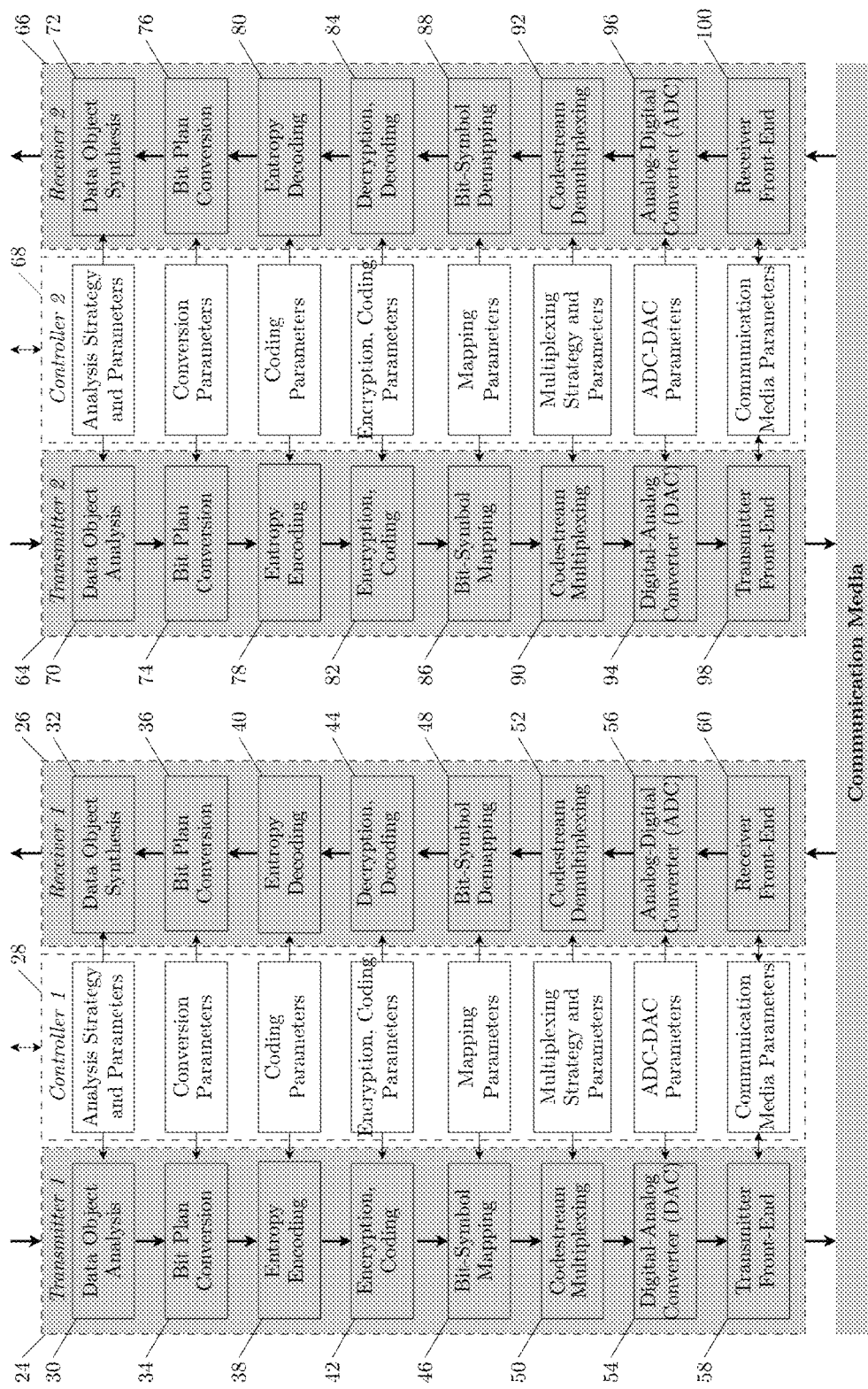
Fig. 3: Data communication using two TOMAS transceivers

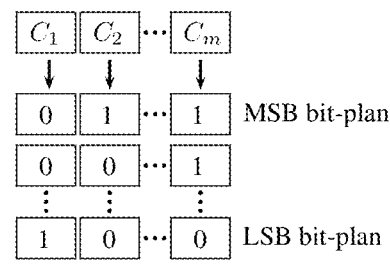
Fig. 4: The structure of the data segment after the bit-plan conversion

METHOD AND APPARATUS FOR EFFICIENT DATA COMMUNICATIONS

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of data communications. More particularly, the present invention is in the technical field of wired and wireless data communication systems. The data communication systems, other than wireless, are considered as the wired data communication systems.

Information is a knowledge (facts) provided or learned about something or someone. Information presumes a transfer (communication) of knowledge from a holder of information to a consumer. The holder and consumer are often separated by some media. In order to share the information, the holder and consumer must use some means of communication. Simple hand signals or verbal conversation become useless communication means, when a distance between the holder and consumer increases and the communication media becomes more complex. In such a case, the process of data sharing is called a telecommunication, the holder of information becomes a sender agent, and a consumer of information becomes a recipient agent. Also the means of communications for the case of telecommunication are much more complex. A process of sharing information using the telecommunication means (system) is called transmission. Voice, sound, image represent the complex information (data), and they are considered as examples of data objects. The process of sharing of a particular data object is considered a data object transmission. The data object transformation is a necessary process to prepare the data object for transmission over the telecommunication media. The process of data object transformation involves plural steps executed by a telecommunication system. Every step of data object transformation is implemented in a block. Blocks are connected in series providing a data object transformation flow. Every block implements a particular data object transformation algorithm, and its efficiency of transformation is characterized by a particular parameter. Traditionally, data transformation blocks are designed by different parties that do not interact while designing their blocks. For example, designers of MPEG 4 coder do not interact with designers of channel coder. Every block has a specification on type of input and output data. Also, the specification includes a list data transformation parameters that can be changed by user. Conventional telecommunication systems, implementing above approach, have reached limits in efficiency of data transmission.

BRIEF SUMMARY OF THE INVENTION

Idea

In search of ways to improve efficiency of data transmission, the inventor used his research in image compression [1], [2], [3], [4], [5]. Certain image decomposition techniques allow to present an image as a set of features or coefficients. It was discovered, that those features has different importance while restoring the image. Applying this discovery for the case of data transmission, one can say that corruption of different image coefficients has different impact on quality of a received image. Generally, every data object (voice, audio, image, etc.) can be presented as a set of features, segments or coefficients. Often a telecommunication system deals with a complex multimedia data object with multiple components such as voice, audio, image, etc. It is a question of application of a proper decomposition technique to each one of those components. A proper decomposition technique choice depends on data object type, content, size, resolution, etc. Data objects can be represented by digital compressed or non-compressed data of different type, size, nature. The data object can be a one-dimensional (1D) signal, such as an audio signal, a voice, a control sequence; a two-dimensional (2D) signal, such as a gray-scale image; a three dimensional signal (3D), such as a static 3D mesh or a color image; a four dimensional signal, such as a dynamic 3D mesh or a color video signal; or a five dimensional signal such as a stereo color video signal. All information about multimedia data object components, their type content, size, resolution, etc. is encapsulated in a multimedia data profile. Hence there was the first conclusion: the multimedia data profile is important for efficient data communications.

The only mission of data object transformation is to prepare the data object for transmission over the telecommunication media. Depending on telecommunication media, the needed process of transformation might be very complex. An engineer faces many challenges while designing a data transformation technique for a particular telecommunication media. The telecommunication media could be a wireless link, a twisted pair cable, a coaxial cable, a fiber optic link, or a waveguide. A signal, while propagating over the telecommunication media, is subjected to many natural and man-made factors. The telecommunication media is characterized by a profile which comprises a number of subbands, bandwidth and error rate of those subbands. Often a telecommunication media profile is in-homogeneous and time-invariant. In some subbands the signal is corrupted more, and in some—less. Hence more important data should be transmitted over subbands with lower error rate. The second conclusion was the following: the telecommunication media profile is important for efficient data communications.

Data transmission requires at least a pair of telecommunication systems: a transmitter and receiver. The communication systems are complex devices that employ multiple hardware, firmware and software components. The transmitter prepares the data object for transmission over the telecommunication media. The algorithm of data object transformation might be very complex. Implementation of the algorithm imposes certain requirements on transmitter performance. The receiver reconstructs the data object from a received signal. Basically, the receiver must implement a set of inverse operations. Therefore performance of the receiver must match the one of the transmitter. The communication system is characterized by its profile which comprises both time-variant and time-invariant characteristics of the system. Time-variant characteristics comprise current load of the system, a charge of batteries and a status of all hardware, firmware and software components. Time-invariant characteristics comprise a plurality of data processing techniques, screen sizes, employed operational systems (OS), etc. Hence there was the third conclusion: the telecommunication system profiles are important for efficient data communications.

Voice, audio or image are objects of interest for the recipient agent. The agents (users) can be human or not human. The not human agent is represented by a hardware device or/and a firmware program or/and a software program. An ideal telecommunication system would provide instantly the recipient with a data object perfectly matching the object sender possesses. In real life, receiving of the data object takes some time, and the received object does not match the sent one. The recipient might wish a certain transmission rate, latency and order; quality, priority, regions of interest (ROI) for each of multimedia data component. The recipient might choose a policy which prioritizes parameters of data transmission. Which is, for example, a quality of received object over transmission speed. All those preferences are stored in user preferences profile. The recipient must share that profile with the sender. Hence there was the forth conclusion: the user preferences profile is important for efficient data communications.

All four above conclusions led to an idea of efficient data transmission which obtains and updates at regular intervals, profiles of the multimedia data, user preferences, communication systems and communication media to provide the user preferences profile. A particular data processing technique from the communication systems profile is used for packing all processed multimedia data components into subbands from the communication media profile. The proposed method was called TOMAS, which is data Transmission oriented on the Object, communication Media, Application, and State of communication systems.

TOMAS is an improvement of a traditional telecommunication method in a way it uses the similar blocks, but TOMAS uses it in more efficiently. Conventional methods treat all data equally, while TOMAS prioritize. A conventional method has only one data flow for all data, while TOMAS has separate data flow for each data stream. Decomposition of the data object into a set of data streams with unequal importance allows TOMAS to treat each stream differently. TOMAS approach gives the flexibility in error protection and transmission speed.

Realization

The idea of TOMAS was implemented in a prototype. An image has been chosen as a data object. A wireless channel has been chosen as a telecommunication media. A model of a pair transmitter-receiver has represented telecommunication systems. The telecommunication systems implemented data transformation algorithms specific for wireless communications. Agents were represented by an application and human operator. The application controlled data communication parameters, and parameters of received image. Human operator controlled visual quality of received image.

A proprietary fast signal processing algorithm was used to decompose the image into a set of features with different importance for image restoration. The mentioned algorithm has also been used to create a profile for the given wireless channel. The profile shows attenuation of the signal in different sub-bands of the channel. The profile allows to organize data streams in such a way that more important image features will be sent over sub-bands with lower attenuation. Time-variant nature of the wireless channel was compensated by regular measurements of channel profile. An effective data transmission was achieved by dynamic reordering of data streams in such a way that more important image features will be sent over sub-bands with lower attenuation. The proprietary fast signal processing algorithm has also been used to multiplex multiple data streams into one data stream to sent over the wireless channel.

Validation

The invented TOMAS method was thoroughly tested in comparison with conventional methods. After filing a provisional application U.S. 61/326,579 on Apr. 21, 2010, results obtained with the prototype were presented on the 10th Wireless Telecommunications Symposium (WTS 2011) in New York, and published [6]. A journal article [7], reviewed by peers, has also validated the invention. A doctoral thesis [8], defended before a jury of specialists in the field, has demonstrated a superior efficiency of the invention. The superior efficiency of data communication is achieved by use of the fast signal processing algorithm disclosed in a nonprovisional patent application U.S. Ser. No. 14/809,707, filed on Jul. 27, 2015 [9] and published in [10]. Authors of research in [11] have implemented the algorithm in a microchip (FPGA), and demonstrated algorithm's high performance in series of experiments.

Conclusion

The invention is a method and apparatus for an improved and efficient data communication. The superior efficiency is achieved by: 1) matching user preferences profiles with communication system profiles and the communication media profile using the data object profile in real time; 2) monitoring of time-varying characteristics of all components, such as a charge of batteries and a status of all hardware, firmware and software components; 3) using an information about time-invariant characteristics of the systems, such as devices screen sizes, employed operational systems (OS), etc.; 4) using a flexible system architecture; and 5) using the fast signal processing algorithm [10].

BRIEF DESCRIPTION OF THE DRAWINGS

FIG. 1 is a general structure of the Data Transmission Oriented on the Object, Communication Media, Agents, and State of Communication Systems;

FIG. 2 is a TOMAS transceiver structure;

FIG. 3 is a data communication using two TOMAS transceivers;

FIG. 4 is a structure of the data segment after the bit-plan conversion.

DETAILED DESCRIPTION OF THE INVENTION

Referring now to the invention in more detail. Data Transmission Oriented on the Object, Communication Media, Agents, and State of Communication Systems is possible in case of two or more communication systems. In FIG. 1 there is shown a structure of the Data Transmission Oriented on the Object, Communication Media, Agents, and State of Communication Systems.

Sent objects 18 represent the sent multimedia data object with multiple components. Received objects 20 represent the received multimedia data object with multiple components. The object can be a one-dimensional (1D) signal, such as an audio signal, a voice, a control sequence; or/and a two-dimensional (2D) signal, such as a grayscale image; or/and a three dimensional signal (3D), such as a static 3D mesh or a color image; or/and a four dimensional signal, such as a dynamic 3D mesh or a color video signal; or/and a five dimensional signal such as a stereo color video signal. The multimedia data object is characterized by its profile. The multimedia object profile contains structure and content of the multimedia data object.

A communication media 22 is a wireless link, a twisted pair cable, a coaxial cable, a fiber optic link, or a waveguide. The communication media is characterized by the communication media profile. The communication media profile contains communication media parameters.

A sender 10 and a recipient 12 are agents or users. The agents can be human or/and not human. The not human agent is represented by a hardware device or/and a firmware program or/and a software program. The user has certain requirements for data transmission. Those requirements are stored in the user preferences profile.

A communication system 14 and a communication system 16 are complex devices with time variant performances that employ multiple hardware, firmware and software components. An efficient data communication depends on reliable functioning of all components. It is provided by obtaining, and updating at regular intervals, or, saying shortly, monitoring of time-varying characteristics of all components, such as a charge of batteries and a status of all hardware, firmware and software components. An efficient data communication also depends on information about time-invariant characteristics of the systems, such as devices' screen sizes, employed operational systems (OS), etc. Those system characteristics are stored in the communication system profile.

The sender 10 interacts with the communication system 14 to send the data objects 18. The communication system 14 interacts with the communication system 16 over the communication media 22 in order to determine the parameters of the communication media 22. The communication system 14 transforms the data objects 18 into data suitable to be transmitted over the communication media 22. For every data object 18 (multimedia data component), the communication system 14 chooses and applies a combination of data processing techniques from its profile, which provides a particular set of recipient 12 user preferences. The communication system 14 packs all processed multimedia data components into subbands from the communication media 22 profile using a particular data processing technique from the communication system 14 profile, which provides a particular set of recipient 12 user preferences.

The communication system 14 transmits the transformed data objects 18 to the communication system 16 over the communication media 22 once the link between the communication system 14 and the communication system 16 has been established. The communication system 16 receives the data from the communication system 14. Often the received data is not the same one which has been transmitted by the communication system 14 due to distortion and/or corruption in the communication media 22. That is why the received objects 20 are not often the same ones that has been transmitted by the communication system 14. The communication system 16 implements an inverse transform of the received data in order to obtain the received objects 20. A recipient 12 interacts with a communication system 16 to obtain the received objects 20. The recipient 12 interacts with the sender 10 to provide a feedback information about parameters of the received objects 20. The sender 10 interacts with the recipient 12 to obtain an information about the received objects' 20 parameters required by the recipient 12.

FIG. 2 represents the structure of communication systems 14 and 16. Each of the systems 14 and 16 consists of a transmitter 24, a receiver 26, and a controller 28. The system which contains both the transmitter and the receiver is often referred as a transceiver. Hence FIG. 2 represents the structure of the transceiver which implements a method of Data Transmission Oriented on the Object, Communication Media, Agents, and State of Communication Systems. Further, the transceiver shown on FIG. 2 is referred as the TOMAS transceiver.

The transmitter 24 consists of a data object analysis block 30, a bit-plan conversion block 34, an entropy encoding block 38, an encryption or/and channel coding block 42, a bit-symbol mapping block 46, a codestream multiplexing block 50, a digital-to-analog (DAC) signal converter block 54, and a transmitter front-end block 58.

The transmitter 24 inputs the sent objects 18, and outputs the data suitable to be transmitted over the particular communication media 22.

The receiver 26 consists of a data object synthesis block 32, a bit-plan conversion block 36, an entropy decoding block 40, a decryption or/and channel decoding block 44, a bit-symbol demapping block 48, a codestream demultiplexing block 52, an analog-to-digital (ADC) signal converter block 56, and a receiver front-end block 60.

The receiver 26 inputs the data transmitted over the particular communication media 22, and outputs the received objects 20.

The controller 28 operates with all transceiver parameters. They are the data object analysis and decomposition parameters, the bit-plan conversion parameters, the entropy encoding parameters, the encryption or/and channel coding parameters, the bit-symbol mapping parameters, the codestream multiplexing parameters, the digital-to-analog and analog-to-digital conversion parameters, and the communication media front-end parameters.

The controller 28 interacts with the sender 10. The controller 28 also interacts with the recipient 12 via the communication media 22.

Legend on FIG. 2 emphasize that the bold arrows between blocks represent codestreams, and the thin arrows represent control signals.

The communication system 14 is called the first TOMAS transceiver. The communication system 16 is called the the second TOMAS transceiver. Data communication using two TOMAS transceivers is shown on FIG. 3. The first TOMAS transceiver consists of a transmitter 24, a receiver 26 and a controller 28. The second TOMAS transceiver consists of a transmitter 64, a receiver 66 and a controller 68.

Data communication between two TOMAS transceivers is divided into two stages. The first stage is establishing a link between two TOMAS transceivers. The second stage is actual data transmission from one transceiver to another.

At the first stage, the controller 28 checks the state of the hardware, firmware and software components of the first TOMAS transceiver 14, and the controller 68 checks the state the state of the hardware, firmware and software components of the second TOMAS transceiver 16.

In case all components of the first TOMAS transceiver 14 are functional, the controller 28 responds to the agent 10 that the TOMAS transceiver 14 is fully operational and the data communication is possible. In case all components of the second TOMAS transceiver 16 are functional, the controller 68 responds to the agent 12 that the TOMAS transceiver 16 is fully operational and the data communication is possible.

In case some non-significant component of the first TOMAS transceiver 14 is not functional, the controller 28 returns to the agent 10 a set of hardware, firmware and software components' configurations that make the TOMAS transceiver 14 partially operational and data communication possible. In case some non-significant component of the second TOMAS transceiver 16 is not functional, the controller 68 returns to the agent 12 a set of hardware, firmware and software components' configurations that make the TOMAS transceiver 16 partially operational and data communication possible.

In case some critical component of the first TOMAS transceiver 14 is not functional, the controller 28 responds to the agent 10 that the TOMAS transceiver 14 is not operational and the data communication is impossible. In case some critical component of the second TOMAS transceiver 16 is not functional, the controller 68 responds to the agent 12 that the TOMAS transceiver 16 is not operational and the data communication is impossible.

After the controller 28 determined that the TOMAS transceiver 14 is fully or partially operational it commands the transmitter 24 to send a "handshake" signal to the TOMAS transceiver 16 over the communication media 22.

After the controller 68 determined that the TOMAS transceiver 16 is fully or partially operational it commands the receiver 24 to wait for the "handshake" signal from the TOMAS transceiver 14 over the communication media 22.

The procedure of sending the "handshake" signal might differ from one communication media type to another. In most cases it would be a signal of certain pattern which is known a-priori by the transmitter 24 and the receiver 66.

After receiver 66 receives the "handshake" signal, the controller 68 commands the transmitter 64 to send a "link established" signal to the TOMAS transceiver 14.

In case communication media 22 is represented by multiple frequency channels, the procedure of sending the "handshake" signal might be repeated by the TOMAS transceiver 14 on multiple frequencies until the "link established" signal will be received from the TOMAS transceiver 16.

After establishing a link between two TOMAS transceivers, the controller 28 and the controller 68 exchange information about the hardware, firmware and software components' configurations and the states of each of the TOMAS transceivers.

The controller 28 commands the transmitter 24 to send a signal for measurement of the communication media parameters. The receiver 66 receives the measurement signal, and the controller 68 processes it by extracting the communication media parameters critical for the data communication. The controller 68 commands the transmitter 64 to send the communication media parameters to the receiver 26. The receiver 26 provides the controller 28 with the communication media parameters, often referred in the art as a communication media profile.

The controller 68 interacts with the recipient 12. The last one can impose certain requirements on the data objects he wants to receive. For example, in case of the image, the recipient 12 can ask the image of different size and/or resolution. The controller 68 commands the transmitter 64 to send the recipient 12 requirements to the receiver 26. The receiver 26 provides the controller 28 with the recipient 12 requirements.

The first stage of establishing a link between the TOMAS transceiver 14 and the TOMAS transceiver 16 is accomplished. After the first stage, the controller 28 of the TOMAS transceiver 14 possesses the information about the communication media parameters, the information about the hardware, firmware and software components' configurations, the state of the TOMAS transceiver 16, and the information about requirements of the agent 12 on the data objects they want to receive.

At the second stage of data transmission from the TOMAS transceiver 14 to the TOMAS transceiver 16, the controller 28 uses the information about the communication media parameters, the information about the hardware, firmware and software components' configurations, the state of both TOMAS transceivers 14 and 16, and the information about requirements of the agent 12 on the data objects they want to receive.

The agent 10 provides the TOMAS transceiver 14 with the data objects 18. The agent 10 can provide the controller 28 the information about the nature of the data objects 18. The agent 10 can impose some requirements on how to proceed with the processing of the data objects 18. The agent 10 can propose an analysis/synthesis technique to be employed by the controller 28 on a particular data object type. However the final choice of the data object analysis/synthesis technique is made by the controller 28. The choice of the data object analysis/synthesis technique is stipulated by the information about the communication media throughput capability, the information about the both TOMAS transceivers' capability, and the information about requirements of the agent 12 on the data objects they want to receive.

The task of the controller 28 is to look for a compromise between agents' demands on object transmission, often referred in the art as a user preferences profile, and communication media/communication system capabilities, often referred in the art as a communication media/communication system profile. In order to fulfill such a task, the controller 28 assigns appropriate parameters to the transceiver's 24 blocks.

The controller 28 chooses an appropriate analysis/synthesis technique for the particular data object. The chosen technique might be appropriate in terms of the received object quality, an algorithm computation speed or complexity, availability of hardware, firmware and software resources to implement such a technique at the moment. Even an intellectual property rights on some particular technique might also be taken into consideration.

The data object analysis block 30 decomposes the sent data object into data segments using the analysis technique assigned by the controller 28. Using some quality criterion of the restored data object, the controller 28 assigns every data segment with a certain index of importance. The first data segment is considered to be more important than the second one, if corruption of the first segment causes more damage to the restored data object than corruption of the second segment. The data object analysis block 30 outputs a set of data segments ranked in descending order according to their importance. The data object analysis block 30 transfers to the controller 28 a list of the data segments ranked according to their importance. The fast signal processing algorithm [9] might be used at this stage.

The controller 28 commands the transmitter 24 to send the parameters of the analysis techniques of each of sent data objects, and the list of the data segments ranked according to their importance. The receiver 66 receives that information and transfers it to the controller 68. Afterwards, the controller 68 transfers the set of analysis parameters to the data object synthesis block 72.

The data object synthesis block 72 restores the data objects from the data segments. The restored data objects are transferred to the recipient 12 as the received objects 20. The fast signal processing algorithm [9] might be used at this stage.

The data object analysis block 30 outputs the data segments represented by floating-point numbers. Upon a request of the controller 28, the bit-plan conversion block 34 transforms the data segments' numbers into fixed-point representation. Truncation or rounding of floating-point numbers might cause the degradation of quality of the restored data object. The bit-plan conversion block 34 represents the second stage of decomposition of the data object into data segments of unequal importance. The bit-plans of the data segment are formed by grouping corresponding bits of the coefficients as it is shown on FIG. 4. The bit-plan of the data segment that consists of the Most Significant Bits (MSB) of the coefficients $C_1 \ldots C_m$ is considered to be the most important. The bit-plan of the data segment that consists of the Least Significant Bits (LSB) of the coefficients $C_1 \ldots C_m$ is considered to be the least important. Upon a request of the controller 28, the bits of each bit-plan are grouped into words. The word length can differ from one bit-plan to another as well as from one data segment to another.

The controller 28 commands the transmitter 24 to send the parameters of the bit-plan conversion of each of data objects' segments. The receiver 66 receives that information and transfers it to the controller 68. Afterwards, the controller 68 transfers a set of bit-plan conversion parameters to the bit-plan conversion block 76.

The entropy encoding block 38 serves to reduce the redundancy of the bit-plan data. The entropy encoding block might implement a Huffman or arithmetic encoding algorithm. The entropy encoding technique consists of two principal stages. The first one is to build the code from the data histogram. And the second one is to encode the data using the obtained code. Upon a request of the controller 28, the entropy encoding block 38 can process separately every data segment of every data object of every bit-plan. Or, upon the request of the controller 28, the entropy encoding block 38 can process separately the bit-plans of all data segments of every data object. Or, upon the request of the controller 28, the entropy encoding block 38 can process separately the bit-plans of all data segments of all data objects. Otherwords, the controller 28 can choose different bit-plan conversion strategy.

The controller 28 commands the transmitter 24 to send the parameters of the entropy encoding. The receiver 66 receives that information and transfers it to the controller 68. Afterwards, the controller 68 transfers a set of the entropy encoding parameters to the entropy decoding block 80.

The entropy encoding block 38 outputs multiple binary code streams of two types: data histograms and entropy encoded data. The data histograms serves to restore an original entropy code. This code is required to decode the entropy encoded data. The data histograms are small is size and very prone to corruption. The entropy encoded data is also prone to corruption. The following rule is true: the shorter entropy code, the less entropy encoded data is prone to corruption. However, decrease of entropy code length leads to increase of entropy encoded data amount needed to be transmitted. The role of the controller 28 is to find an optimal code length to satisfy the conditions of the data transmission.

Upon request of the agents 10 and 12, the controller 28 can be required to apply encryption on bitstreams. This is implemented in the encryption/coding block 42. Given harsh communication media 22 conditions, the controller can command to apply a channel coding technique which is also implemented in the encryption/coding block 42.

The controller 28 commands the transmitter 24 to send the parameters of the encryption and/or channel coding. The receiver 66 receives that information and transfers it to the controller 68. Afterwards, the controller 68 transfers a set of the encryption and/or channel coding parameters to the decryption/decoding block 84. The encryption/coding block 42 outputs multiple bitstreams.

The bit-symbol mapping block 46 improves spectral efficiency of the TOMAS transceiver by mapping a group of bits into a complex symbol. A definition of spectral efficiency is presented in Equation (1) below. Upon a request of the controller 28, every bitstream can be mapped using a different or the same bit-symbol mapping technique. The type of the mapping technique depends on communication media's 22 conditions, a digital-to-analog converter (DAC) block's 54 resolution and analog-to-digital converter (ADC) block's 96 resolution. For example, the controller 28 cannot propose the 10 bit quadrature amplitude bit-symbol mapping in case the resolution of the analog-to-digital converter 96 is eight bit only and a noise level in the communication channel is too high. In most cases the bit-symbol mapping block 46 outputs the multiple parallel streams of complex symbols.

The controller 28 commands the transmitter 24 to send the parameters of the bit-symbol mapping. The receiver 66 receives that information and transfers it to the controller 68. The controller 68 transfer a set of the bit-symbol mapping parameters to the bit-symbol demapping block 88.

The multiple parallel code streams of complex symbols are packed by the code-stream multiplexing block 50 in order to be sent serially. This parallel-to-serial conversion can be implemented by traditional techniques such as: Time-Division Multiplexing (TDM), Code-Division Multiplexing (CDM), Frequency Division Multiplexing (FDM), Orthogonal Frequency Division Multiplexing (OFDM); or a novel multiplexing technique based on the fast signal processing method.

Time-invariant nature of communication media profile (channel profile) can be estimated using N pilot signals multiplexed and sent over a communication channel in regular intervals of time. According to that profile, the channel can be divided into subchannels. Efficient data communication can be organized in particular subchannels that satisfy the requirement on Quality of Service (QoS). The superior efficiency of TOMAS for wireless communication media is achieved by modeling a wireless channel profile using the fast signal processing algorithm [9]. The obtained channel model predicts attenuations of each of subbands. Use of this information allows organizing datastream coding, mapping and multiplexing more efficiently.

The controller 28 chooses an appropriate parallel-to-serial conversion technique. The controller 28 commands the transmitter 24 to send the parameters of the parallel-to-serial conversion technique. The receiver 66 receives that information and transfers it to the controller 68. The controller 68 transfers a set of the parallel-to-serial conversion parameters to the codestream demultiplexing block 92.

The digital-to-analog converter (DAC) block 54 transforms a serial complex digital signal of fixed bit resolution into an analog signal, often called an intermediate frequency (IF) signal.

The TOMAS transceiver 14 contains a transmitter front-end 58 and a receiver front-end 60. The TOMAS transceiver 16 contains a transmitter front-end 98 and a receiver front-end 100. A type of front-end depends on the communication media 22. The wireless link, twisted pair cable, coaxial cable, fiber optic link, or waveguide requires different transmitter and receiver front-ends. Commonly, the transmitter front-ends 58 and 98 transform the intermediate frequency (IF) signals into higher frequency signals and transmit them over some particular communication media. In some cases the high-frequency signal is transmitted over multiple communication media types. For example, the coaxial cable is connected from the transmitter output to the antenna emitting in an open space. Another coaxial cable is connected from the antenna to the receiver input. In this case we have three communication media types serving as the communication media 22.

The receiver front-ends 60 and 100 receive higher frequency signals and transform them into the intermediate frequency (IF) signals.

Using the parameters provided by the controller 68, the analog-to-digital converter (ADC) block 96 transforms the analog intermediate frequency (IF) signal into the serial complex digital signal of fixed bit resolution.

Using the parameters provided by the controller 68, the codestream demultiplexing block 92 transforms the serial codestream into the multiple parallel codestreams.

Using the parameters provided by the controller 68, the bit-symbol demapping block 88 transforms the multiple parallel codestreams of complex symbols into the multiple parallel binary codestreams.

Using the parameters provided by the controller 68, the decryption/channel decoding block 84 transforms the multiple parallel binary codestreams into the multiple parallel bitstreams.

Using the parameters provided by the controller 68, the entropy decoding block 80 rebuilds the entropy code from the received histograms, and decodes the data segment words.

Using the parameters provided by the controller 68, the bit-plan conversion block 76 transforms the data segment words into the data segment bit-plans and afterwards into the coefficients of data object segments.

Using the parameters provided by the controller 68, the data object synthesis block 72 assembles the data objects from their segments.

Finally, the recipient 12 receives their data objects. This concludes description of the method of data Transmission Oriented on the Object, Communication Media, Agents, and State of Communication Systems for the case of a pair of communication systems.

Performance Parameters of Communication System

In order to evaluate the performance of a communication system, the following parameters are used:

$$\text{Spectral Efficiency} = \frac{\text{Total Object Bits}}{\text{Transmitted Symbols}}, \quad (1)$$

$$\text{Complexity} = \frac{\text{Total Processing Operations}}{\text{Total Object Bits}}, \quad (2)$$

Spectral efficiency (1) is measured in bits-per-symbol. It depends on number of transmitted symbols. Hence, the communication system has high spectral efficiency when it represents the data object by a minimal number of symbols. One should note that, in case of fixed symbol mapping parameters, any kind of channel coding employed by the system will decrease the spectral efficiency.

Complexity of the communication system is measured by the Algorithm Complexity parameter (2). It reflects how many real additions and multiplications are required in order to process one bit of the transmitted data object.

The invention can be implemented in a form of software, firmware running on computing devices or a hardware. Despite the fact that data communication is possible in case of at least two TOMAS transceivers, the scenarios of communication between multiple TOMAS transceivers are also considered.

While the invention has been shown and described with reference to certain preferred embodiments thereof, it will be understood by those skilled in the art that various changes in form and details may be made therein without departing from the spirit and scope of the invention as defined by the appended claims.

REFERENCES

[1] M. Sabelkin, "Threshold choice in algorithm of image compression based on 2D discrete wavelet transform," *Aerospace Technique and Technology Journal*, vol. 21, pp. 186-191, 2000.

[2] —, "Wavelet coefficient thresholding for radar image compression," in *First International Workshop on Mathematical Modelling of Physical Processes in Inhomogeneous Media*, 2001, pp. 47-49.

[3] M. Sabelkin and V. Lukin, "Image compression method based on 2D discrete wavelet transform," *Aerospace Technique and Technology Journal*, vol. 12, pp. 100-102, 1999.

[4] M. Sabelkin and V. Piscorzh, "Method of image coding," in *International Symposium on Information Theory and its Applications*, 1998, pp. 663-665.

[5] M. Sabelkin and N. Ponomarenko, "MM-band radar image wavelet compression with prefiltering," in *International Symposium on Physics and Engineering of Millimeter and Submillimeter Waves*, 2001, pp. 280-282.

[6] M. Sabelkin and F. Gagnon, "Combined source-channel transform for image transmission over wireless channel," in *10th Wireless Telecommunications Symposium (WTS 2011)*, April 2011, p. 4.

[7] —, "Data Transmission Oriented on the Object, Communication Media, Agents, and State of Communication Systems," *International Journal of Interdisciplinary Telecommunications and Networking (IJITN)*, vol. 3, no. 2, pp. 51-65, 2011.

[8] M. Sabelkin, "Data transmission oriented on the object, communication media, application, and state of communication systems: Tactical communication system application," Ph.D. dissertation, Ecole de technologie superieure, Montreal, Canada, 11 2011.

[9] —, "Method and Apparatus for Fast Signal Processing," patent application U.S. Ser. No. 14/809,707, filed on Jul. 27, 2015.

[10] M. Sabelkin and F. Gagnon, "Fast transform for multicarrier wireless communications," in *7th International Conference on Wireless Advanced 2011 (WiAd 2011)*, June 2011, p. 6.

[11] H. N. Abdullah, F. Hassan, and A. A. Valenzuela, "FPGA based fast complex wavelet packet modulation (FCWPM) system," in *IEEE international Conference on Circuits and Systems (IGCAS2013)* at Kuala Lumpur, Malaysia, September 2013, pp. 114-119.

[12] M. Sabelkin, "Method and Apparatus for Data Transmission Oriented on the Object, Communication Media, Agents, and State of Communication Systems," patent application U.S. Ser. No. 13/090,608, filed on Apr. 21, 2011.

What is claimed:

1. A method for transmission of a multimedia data, comprising:

obtaining, and updating at regular intervals, profiles of said multimedia data, user preferences, communication systems and communication media;

for every multimedia data component, choosing and applying a combination of data processing techniques from said communication systems profile, which provides a particular set of user preferences;

packing all processed multimedia data components into subbands from said communication media profile using a particular data processing technique from said communication systems profile, which provides said particular set of user preferences;

wherein said multimedia data profile comprises a number of components, type, content, size, resolution;

wherein said user preferences profile comprises negotiated user preferences on transmission rate, latency and order; quality, priority, regions of interest (ROI) for each of multimedia data component chosen by a user;

wherein said communication systems profile comprises a plurality of data processing techniques including data decomposition-restoration, data encoding-decoding, data mapping-demapping, data multiplexing-demultiplexing and implemented in communication systems;

current load of said communication systems;

wherein said communication media profile comprises a number of subbands, bandwidth and error rate of said subbands;

whereby instant said particular set of user preferences while transmitting said multimedia data over communication media with time-variant said communication media profile using communication systems with time-variant said communication systems profile is provided.

2. The method according to claim 1 wherein said multimedia data is represented by a combination of digital data of plural types, sizes, nature, and dimensions.

3. The method according to claim 1 wherein said communication media is represented by wireless communication media.

4. The method according to claim 1 wherein said communication media is represented by non-wireless communication media.

5. The method according to claim 1 wherein a fast signal processing algorithm is used to decompose said multimedia data component into a set of data features.

6. The method according to claim 1 wherein a fast signal processing algorithm is used to reconstruct said multimedia data component from a set of data features.

7. The method according to claim 1 wherein a fast signal processing algorithm is used to obtain said communication media profile.

8. The method according to claim 1 wherein a fast signal processing algorithm is used for said packing all processed multimedia data components into subbands from said communication media profile.

9. A system for efficient data communication comprising a pair of transceivers that operate according to claim 1.

10. A communication network comprising plural systems wherein each of said systems is described in claim 9.

* * * * *